No. 828,272. PATENTED AUG. 7, 1906.
R. B. CHARLTON.
METHOD OF MANUFACTURING FISH PLATES.
APPLICATION FILED NOV. 25, 1903.
3 SHEETS—SHEET 1.
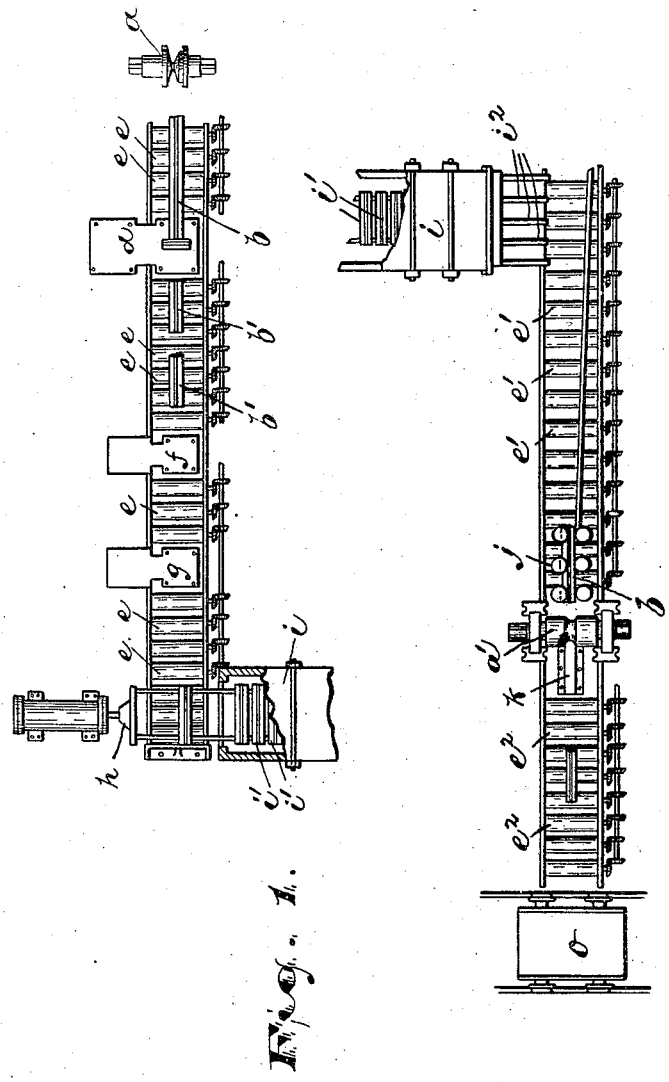
WITNESSES:
Ralph Lancaster.
Russell M. Everett.
INVENTOR:
Richard B. Charlton,
BY
Charles H. Peel,
ATTORNEY.

No. 828,272.
PATENTED AUG. 7, 1906.
R. B. CHARLTON.
METHOD OF MANUFACTURING FISH PLATES.
APPLICATION FILED NOV. 25, 1903.
3 SHEETS—SHEET 2.
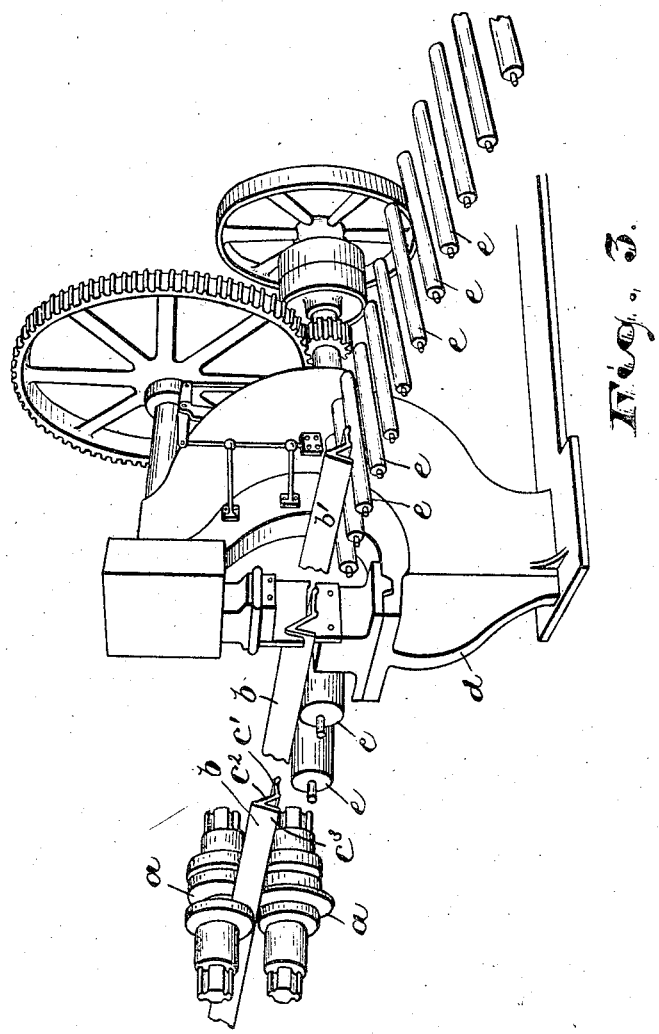
WITNESSES:
Ralph Lancaster.
Russell M. Everett.
INVENTOR:
Richard B. Charlton,
BY
Charles H. Pell
ATTORNEY.

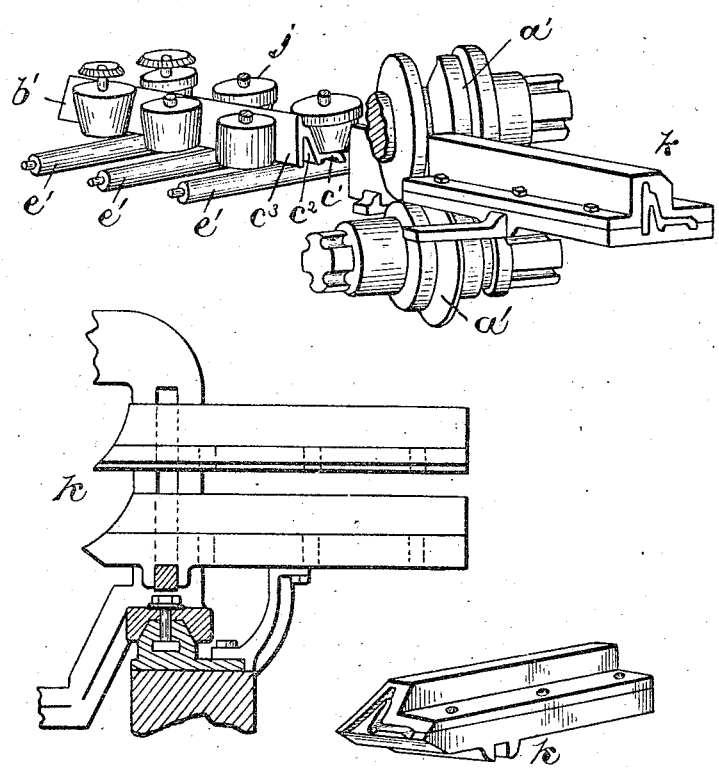

UNITED STATES PATENT OFFICE.

RICHARD B. CHARLTON, OF MILWAUKEE, WISCONSIN, ASSIGNOR, BY MESNE ASSIGNMENTS, OF ONE-HALF TO THE RAIL JOINT COMPANY, A CORPORATION OF NEW YORK, AND ONE-HALF TO ILLINOIS STEEL COMPANY, A CORPORATION OF ILLINOIS.

METHOD OF MANUFACTURING FISH-PLATES.

No. 828,272.      Specification of Letters Patent.      Patented Aug. 7, 1906.

Original application filed August 10, 1901, Serial No. 71,610. Divided and this application filed November 25, 1903. Serial No. 182,578.

*To all whom it may concern:*

Be it known that I, RICHARD B. CHARLTON, a citizen of the United States, residing at Milwaukee, in the county of Milwaukee and State of Wisconsin, have invented and produced a new and original Improvement in Methods of Manufacturing Fish-Plates; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The present application is a division of my application, Serial No. 71,610, filed August 10, 1901.

This invention relates to the manufacture of that class of fish-plates or rail-joint connections represented by the one shown in the United States Patent No. 427,017, of April 29, 1890, the objects of the present invention in general being to secure an improved method of manufacturing said fish-plates.

More specifically the objects of the invention are to enable the fish-plates to be rolled in bars of any desired length and afterward to be sheared into proper length for use instead of sawing, as heretofore; to do this by securing proper cross-sectional distribution of the metal through rolling, while at the same time leaving the bar sufficiently open longitudinally to permit its being sheared into proper lengths, which are afterward compressed or bent into final form, and to secure other advantages and results, some of which may be hereinafter referred to in connection with the description of the working parts.

The invention consists in the improved method of manufacturing fish-plates and in the arrangements and combinations of parts of the same, all substantially as will be hereinafter set forth, and finally embraced in the clauses of the claim.

Referring to the accompanying drawings, in which like letters of reference indicate corresponding parts in each of the several figures, Figures 1 and 2 show in plan an apparatus for carrying out my improved method, Fig. 2 being a continuation of Fig. 1 and the parts of the furnace $i$ being shown in said Figs. 1 and 2 disconnected. Fig. 3 is a perspective view of shearing devices, and Fig. 4 is a similar view of vertical bending-rolls, finishing-rolls, and guide-box. Fig. 5 is a perspective view of a guide-box, and Fig. 6 shows the same in side elevation with its halves separated and illustrating its connection to the roll-housings.

In said drawings, $a\ a$ indicate those rolls of a set which form the last pass, said pass being adapted to deliver a bar $b$, rolled into suitable cross-sectional shape to form fish-plates having the upright member $c'$, inclined member $c^2$, and base member $c^3$ doubled beneath the inclined member $c^2$, so as to embrace the base-flange of a rail. As said bar issues from the rolls $a$ its base member $c^3$ is by my improved method left diverging from the inclined member $c^2$ at much greater angle than required to receive the base-flange of a rail and permits the bar to pass through shears $d$ and be readily sheared into pieces $b'$ of the right length to form fish-plates. If, on the other hand, the bar were rolled to final cross-sectional form at once, it would be impossible or highly impractical to shear it and it would have to be sawed. These pieces $b'$ are then carried by conveyer-rollers $e$ of any common form to a punch $f$, by means of which the usual bolt-holes are formed in the upright member $c'$. The fish-plate then passes to a slotting-machine $g$, which makes the usual spike-holes at the outer edge of the doubled portion.

It will be understood that the spread or open form in which the fish-plate bar is rolled permits or facilitates to a great extent its shearing, punching, and slotting. After these operations are concluded the fish-plates are preferably pushed by a pusher $h$, working transversely of the conveyer $e$, into an automatic furnace $i$, where they are reheated. The fish-plates are pushed into and through said furnace in a side-by-side series, as at $i'$, one being ejected as a new one is pushed in and each particular fish-plate occupying considerable time in passing through the furnace, so that it is thoroughly heated.

Each fish-plate emerges from the reheating-furnace by inclined skids $i^2$ onto conveyer-rollers $e'$, which carry it forward to vertically-disposed bending-rolls $j$. These rolls are shaped to conform one series to the outside of the fish-plate and the other to the base member, and as the fish-plate passes between the two series its doubled portion is pressed together to reduce the angular recess and bring the base member $c^3$ into proper relation to the other parts. After leaving said closing or bending rolls $j$ the fish-plate is preferably passed immediately between horizontal rolls $a'\ a'$, providing a finishing-pass which aids in insuring a final uniform shape to the fish-plates. On issuing from this pass the fish-plate enters a guide-box $k$, (shown particularly in Figs. 4, 5, and 6 and fully described in my copending application, Serial No. 71,610, filed August 10, 1901,) said guide-box serving to prevent any warping or twisting action of the rolls on the fish-plate in delivering it. Each fish-plate is in turn pushed out of the guide-box by the one next following and is carried by suitable conveying means $e^2$ to a tram-car $o$ for shipment.

By the method of manufacture thus described it is possible to shear the fish-plates or fish-plate bars instead of sawing them, and thus the objectionable saw-burs which interfere with the use of the fish-plate unless removed by an additional operation are avoided and not only is a more perfect product secured, but labor and expense saved in manufacturing. Obviously the punching, slotting, and reheating can take place at any convenient times with reference to the shearing and closing-in operations, and under some conditions the bars may be passed so quickly and directly from the shears to the closing-in and finishing rolls that no reheating is necessary. Furthermore, the reheating and passing through vertical and horizontal rolls eliminates the strain on the metal due to punching and slotting, and again the finishing at low heat makes the metal denser, all as will be understood by one skilled in the art.

Obviously any mechanisms other than those specifically shown and described in this application can be employed in carrying out my improved method or process, those shown being merely for purposes of illustration.

Having thus described the invention, what I claim as new is—

1. The art of manufacturing railway-rail-joint plates or bars having rail-seating base portions or flanges, which consists in first rolling a bar to a shape approximating the finished shape, but having a greater angle between its rail-seating base-flange and its web portion to facilitate subsequent shearing, then shearing the bar into lengths, and finally pressing each length to partially close the said angle and shape the plate to a fit.

2. The art of manufacturing railway-rail-joint plates or bars having rail-seating base portions or flanges, which consists in rolling a bar to a shape approximating the finished shape, but with its rail-seating base portion bent downwardly at an acute angle to its true position to facilitate the operation of a shearing-tool, then shearing the bar into lengths, and subsequently reheating the sheared lengths and bending or pressing them to bring said base portions to their true positions to shape the plates as a whole to a working fit.

In testimony that I claim the foregoing I have hereunto set my hand this 16th day of November, 1903.

RICHARD B. CHARLTON.

Witnesses:
M. E. CHRISTENSEN
P. H. ESTES.